Figure 1:
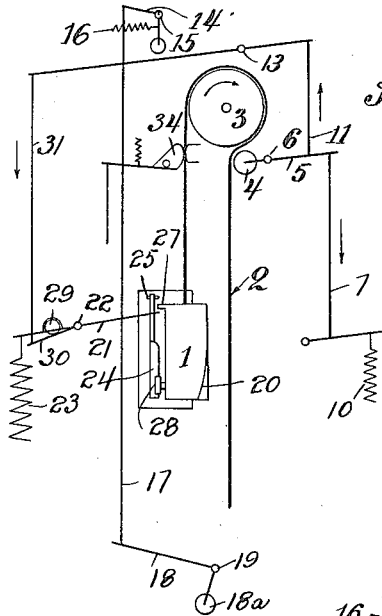

R. GROSDIDIER.
DROP HAMMER.
APPLICATION FILED MAR. 29, 1913.

1,128,131.

Patented Feb. 9, 1915.
3 SHEETS—SHEET 1.

WITNESSES

INVENTOR
René Grosdidier
BY
ATTORNEYS

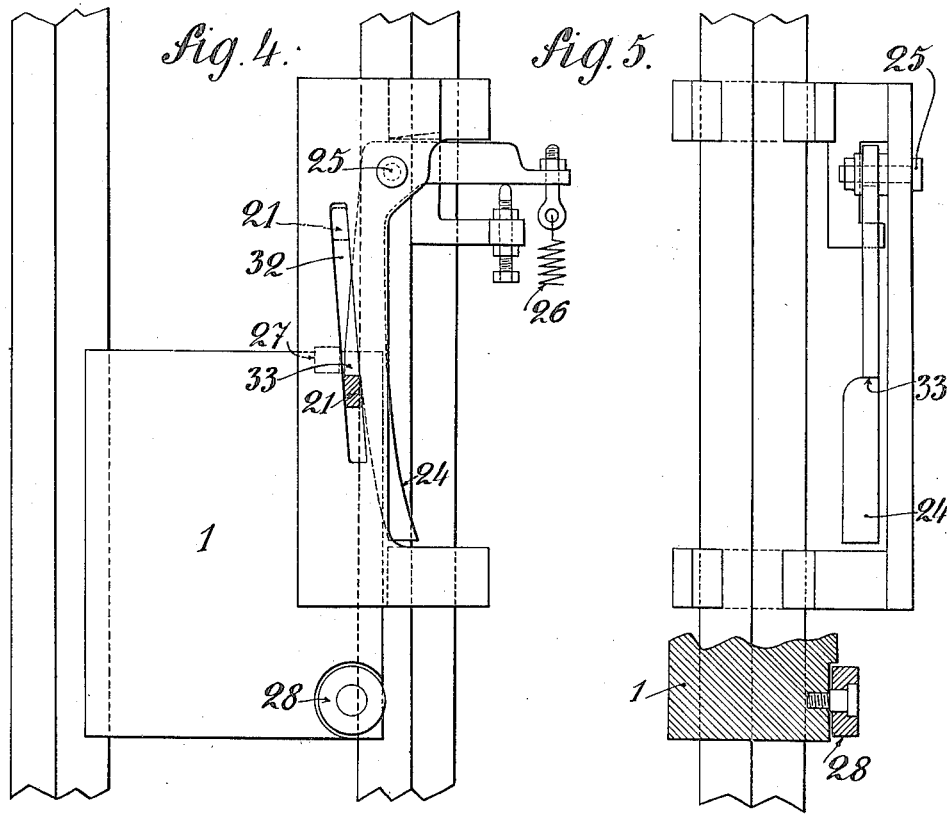

R. GROSDIDIER.
DROP HAMMER.
APPLICATION FILED MAR. 29, 1913.
1,128,131. Patented Feb. 9, 1915.
3 SHEETS—SHEET 3.
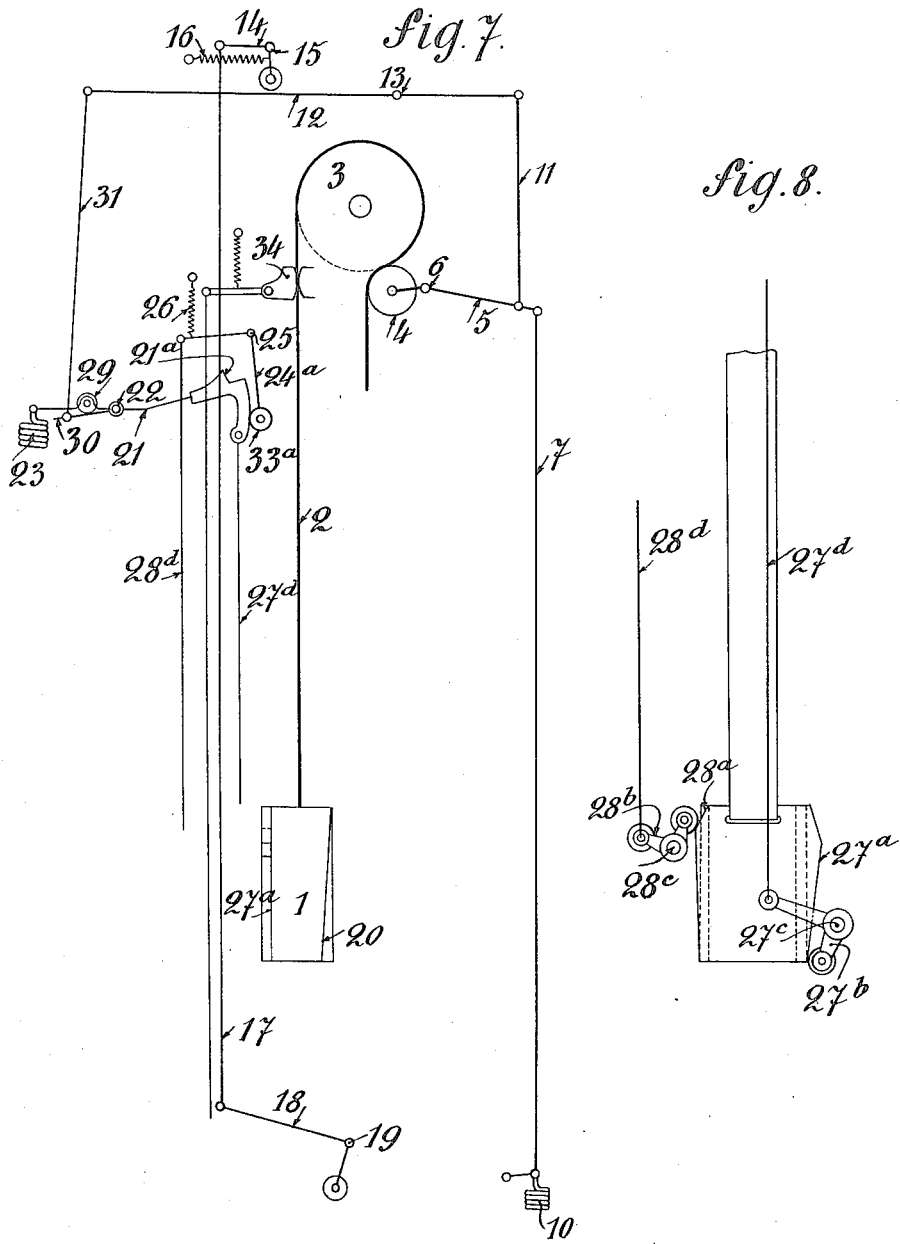
WITNESSES
W. B. Baker
P. J. Rollware
INVENTOR
René Grosdidier
BY Munn & Co.
ATTORNEYS

UNITED STATES PATENT OFFICE.

RENÉ GROSDIDIER, OF COMMERCY, FRANCE.

DROP-HAMMER.

1,128,131.  Specification of Letters Patent.  Patented Feb. 9, 1915.

Application filed March 29, 1913. Serial No. 757,574.

*To all whom it may concern:*

Be it known that I, RENÉ GROSDIDIER, administrator of the Société Anonyme des Forges et Aciéries de Commercy, a citizen of the Republic of France, residing at Commercy, Meuse, in the Republic of France, have invented certain new and useful Improvements in Drop-Hammers, of which the following is a specification.

In the stampers or rams and hammers having a strap, the upward and downward motions of the mass are produced by means of a friction carrying device which acts on the strap carrying the mass when such device is in gear and which abandons the same to the action of gravity when it is out of gear. The connection is produced automatically by the action of the mass on a clutching device, on arriving at the bottom of its throw, so that such mass is lifted up again. Furthermore, the disconnection is also produced automatically by the direct action of the mass on the clutching device on the arrival of such mass at the top of its throw. Such method of disconnection gives rise to a serious drawback, in that such disconnection is always imperfect and does not entirely do away with the friction of the controlling mechanism on the strap; indeed, when the mass on rising begins to act on the clutching device, the latter produces a diminution of the friction and the stress which tends to uplift the mass is gradually reduced until it is equal to the weight of the latter; at such moment the weight balances the friction and, as soon as its live force no longer exists, the mass no longer rises; ceasing to rise, the mass no further acts on the clutching device, so that the friction tends to remain at the degree where it nearly balances the action of gravity. The result is heavy rubbing of the controlling members on the strap, and consequently a wear and tear which is very detrimental to the duration of such members and to their proper operation; the mechanism is upset and requires a frequent and onerous up keep.

For the purpose of avoiding such inconveniences, the invention consists in producing the disconnection, no longer by the direct action of the mass on the clutching device on the arrival of such mass at the top of its throw, but by the action of an auxiliary clutching device which acts in antagonism to the usual clutching device and which is more powerful than the latter, such auxiliary clutching device being trussed and locked in position during the descent of the mass, and then released by the latter on its return to the top of its throw. In this manner, when the mass on rising releases the auxiliary clutching device, the latter overcomes the action of the usual clutching device and produces quickly the complete disconnection of the controlling mechanism; the friction is then annihilated even if the mass ceases to rise as soon as the release takes place. The disconnection is thus produced by the passage of the mass at a predetermined point on its upward throw, regardless of its speed at such point and of the position where it stops.

The accompanying drawings show by way of example one embodiment of this invention as applied to a stamper or ram having a strap.

Figure 2:
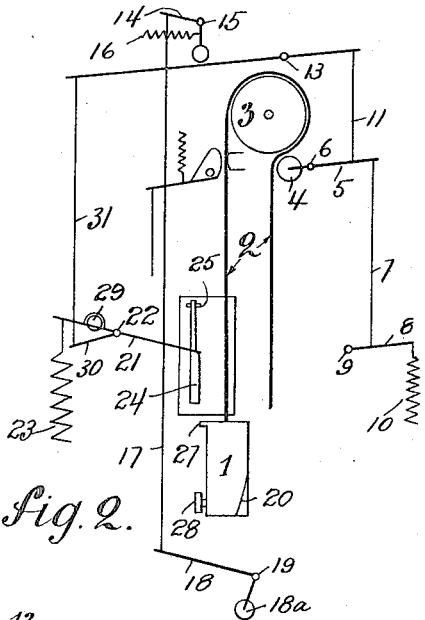
Figure 3:
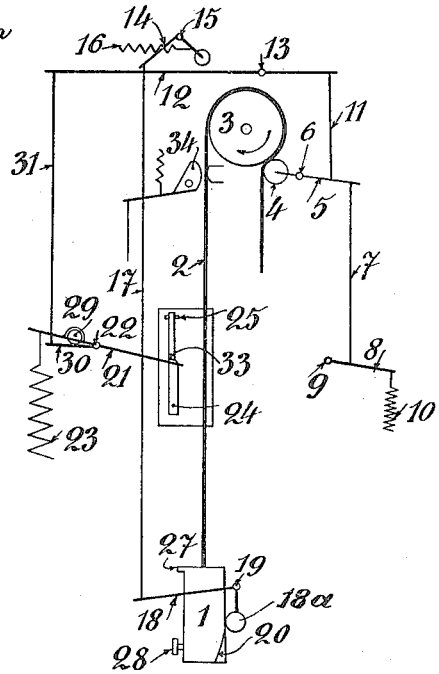

Figures 1 to 3 are diagrams showing three different positions of the main elements of the mechanism. Fig. 4 is an elevation of a part of the clutching mechanism, the mass being near the top of its throw. Fig. 5 is another detail elevation of such mechanism, the mass being partially broken away and the remainder shown in setting. Fig. 6 is a top plan view of the parts shown in Fig. 4. Figs. 7 and 8 show another embodiment of the invention, Fig. 8 being a detail thereof.

In Figs. 1 to 6, 1 designates the mass, 2 the strap carrying the same, 3 the controlling drum around which the strap passes and 4 a movable roller serving to produce the adherence of the strap to the drum. Such roller is carried by a lever 5 oscillating on a stud 6 and connected by a link 7 with a lever 8 which swings on a stud 9 and is subjected to the action of a spring 10. The lever 5 is further connected by a link 11 with a lever 12 oscillating on a stud 13. Such lever can be held in the position shown in Fig. 2, against the action of the spring 10, by a locking lever 14 which oscillates on a stud 15 and which is subjected to the action of a spring 16; a link 17 connects the lever 14 to another lever 18 which is mounted on a stud 19 and arranged to be actuated by a cam surface 20 of the mass 1. One arm of the angle lever 18 has a counterbalance weight 18ª. When the mass reaches the bottom end of its throw, such surface 20 causes the lever 18 to swing, so that the lever 14 releases the lever 12 and allows the same to oscillate under the action of the spring 10 as shown in Fig. 3; the lever 5 is thus caused to swing and to close the roller 4 to the drum 3, which determines the adherence of the strap to the drum and consequently the uplifting of the mass 1. To move the roller 4 away from the drum 3 when the mass returns to the top of its throw, there is arranged according to this invention a clutching device comprising for instance a lever 21 oscillating on a stud 22 and subjected to the action of a spring 23, a locking latch 24 swinging on a stud 25 and subjected to the action of a spring 26 (Fig. 4), an arm or lug 27 and a roller 28 mounted on the mass 1 and arranged to act respectively on the lever 21 and on the latch 24 and a connection comprising a set of members 29, 30, 31 between the levers 12 and 21; such connection consists for instance of a cam 29 mounted on the lever 21, a lever 30 swinging on the stud 22 independently of the lever 21 and a rod 31 connecting the lever 30 with the lever 12, the said cam 29 being arranged to drag the lever 30 when the lever 21 is actuated by the spring 23. The arm 27 is arranged to move one end of the lever 21 upwardly as the mass 1 is moving downward; such lever 21 is furthermore guided in an inclined groove 32 so that it escapes the action of the arm 27 on being lowered sufficiently to become engaged underneath the lip 33 of the latch 24.

The operation is as follows:—As the mass is rising, the lever 21 is locked under the lip 33 of the latch 24, so that the action of the spring 23 is of no effect and the whole of the action of the spring 10 is made use of holding in gear the device controlling the strap. The arm 27 on reaching the lever 21, passes by the latter without dragging the same; then the roller 28 strikes the latch 24 and causes the same to swing, so that when the mass reaches the top of its throw, the lip 33 of the latch moves away from the lever 21; the latter is then quickly restored by the spring 23 and, through the medium of the members 29, 30, 31, causes the lever 12 to swing in such a manner as to produce the disconnection of the controlling member notwithstanding the continuous action of the spring 10 (Fig. 1). All friction being done away with, the mass comes to a stop and falls down again under its own weight. Unless it be purposely retained by means of the stop cam 34, it moves farther down and carries along the lever 21 the end of which has again come underneath the member 27; by means of the set of members provided in the connection between the levers 21 and 12, the lever 21 is restored to the position shown in Fig. 2 against the action of the spring 23, while the lever 12 remains held in the position of disconnection by the lever 14 which has been restored previously by the spring 16; the result is that the lever 21 lies locked again underneath the lip of the latch 24 and that the mass continues to move freely down. On the latter reaching the bottom of its throw, the cam 20 actuates the clutching device which again determines the rise of the mass as hereinbefore explained. It will be understood that all that need be done is to so proportion the tensions of the springs 23 and 10 to move the roller 4 as quickly and as far away from the drum 3 on the release of the lever 21 from its locked position, in order to avoid any useless friction on the strap.

The embodiment shown in Figs. 7 and 8 differs from the previous one by the provision of means whereby to allow of changing more easily the heights from which the mass is to fall. To actuate the lever 21, the mass 1 carries in this instance a lateral cam $27^a$ which actuates the lever 21 through the medium of a bell crank lever $27^b$ swinging around a stud $27^c$ and connected with the lever 21 by a link $27^d$ (Fig. 8). In the second place, the latch 24 is replaced by a bell crank lever $24^a$ swinging around a stud 25 and subjected to the action of a contracting spring 26; the lower end of the lever $24^a$ is provided with a roller $33^a$ and is enabled to engage a slot $21^a$ of the lever 21; the release is obtained by means of an inclined plane $28^a$ formed on the mass and acting on a bell crank lever $28^b$, which swings around an axis $28^c$ and which is connected with the lever $24^a$ by a link $28^d$ (Fig. 8).

The operation of the modified mechanism is as follows:—As the mass is rising, the lever 21 is locked under the roller $33^a$ of the lever $24^a$, so that the action of the spring 23 is of no effect and all the action of the spring 10 is made use of to keep in gear the mechanism controlling the strap. When the cam surface $27^a$ on rising comes near the lever $27^b$, it does not act on the latter as it had been moved away on the previous descent. Soon afterward, the cam surface $28^a$ strikes the lever $28^b$ which, through the medium of the link $28^d$, causes the lever $24^a$ to oscillate; the roller $33^a$ is then disengaged from the slot $21^a$ and the lever 21 is suddenly contracted by the spring 23; through the medium of the members 29, 30, 31, the lever 21 causes the lever 12 to swing so as to produce the disconnection of the controlling mechanism notwithstanding the permanent action of the spring 10. All friction being done away with, the mass comes to a stop and falls under the action of its own weight. Unless it be retained purposely by means of the stop cam 34, it moves still farther down and freely so; the cam surface $27^a$ then actuates the lever $27^b$, which has been replaced in its path on the disconnection of the lever 21, so that the link $27^d$ is pulled and causes the lever 21 to lower in tightening the spring 23 and to come again underneath the roller 33ª of the lever 24ª, which is recalled by its spring 26. So the lever 21 is locked again, while the lever 12 is maintained in the disconnected position by the the lever 14, which has been restored previously by the spring 16; the result is that the mass moves still farther down. On the latter reaching the bottom of its throw, the cam surface 20 causes the lever 18 to swing, so the lever 14 releases the lever 12 and allows the same to swing under the influence of the spring 10 to actuate the clutching device, which again determines the rise of the mass. When it is desired to change the height of the fall of the mass, all that need be done is to slide the axes 27ᶜ and 28ᶜ on the columns of the points of the levers 27ᵇ and 28ᵇ on the links 27ᵈ and 28ᵈ.

It will be understood that within the scope of this invention the clutching and releasing devices may be fitted otherwise, as well as the means whereby they are actuated notably in the case of the application of the invention to stampers or rams having a plank.

Claims.

1. In a drop-hammer having a strap, the combination of a driving pulley, a strap passing over such pulley, a hammer attached to the strap, a closing clutch spring, a closing clutch device subjected to the action of such spring to secure the adherence of the strap to the pulley, a locking device adapted to maintain the said closing clutch device against the action of its spring, means actuated by the hammer at the bottom of the stroke and operatively connected with the said locking device, an opening clutch spring, an opening clutch device subjected to the action of such opening clutch spring and arranged to be actuated by the hammer on a portion of the stroke of the latter, and a locking device adapted to maintain such opening clutch device against the action of its spring and to be actuated by the hammer at the top of its stroke, the opening clutch device being operatively connected with play to the closing clutch device, and the opening clutch spring being strong enough to overcome the closing clutch spring.

2. In a drop-hammer, a drum, a hammer, a strap attached to the hammer and passing over the drum, spring actuated means for pressing the strap against the drum, a lever connected with the pressure means, a locking device for said lever, means for releasing the locking device from the hammer when it reaches the limit of its downward movement, a spring actuated lever operated by the hammer during its upward movement, means connected with the lever with which the pressure means is connected and operated by the spring actuated lever, and a locking device for the spring actuated lever and operated by the hammer at the limit of its upward movement.

3. In a drop hammer, a drum, a hammer, a strap attached to the hammer and passing over the drum, a spring actuated lever having a roller at its end for pressing the strap against the drum, a pivoted lever connected with the lever carrying the roller, a spring actuated locking lever engaging the second lever, and a lever connected with the locking lever and operated by the hammer at the limit of its downward movement to release the locking lever.

4. In a drop hammer, a drum, a hammer, a strap attached to the hammer and passing over the drum, spring actuated means for pressing the strap against the drum, a pivoted lever connected with the pressure means, a pivoted and spring pressed lever operated by the hammer in its upward movement, a pivoted member connected with the first-named lever, means carried by the spring pressed lever for operating the said member, and a locking device for the spring pressed lever operated by the hammer at the limit of its upward movement.

In testimony, that I claim the foregoing as my invention I have signed my name in presence of two subscribing witnesses.

RENÉ GROSDIDIER.

Witnesses:
 CAMILLE BLÉTRY,
 EUGENE WATTIER.

Copies of this patent may be obtained for five cents each, by addressing the "Commissioner of Patents, Washington, D. C."